United States Patent
Spence et al.

(10) Patent No.: US 11,886,092 B2
(45) Date of Patent: Jan. 30, 2024

(54) MACH ZEHNDER INTERFEROMETER FOR MAGIC STATE DISTILLATION

(71) Applicants: Scott E. Spence, Fredericksburg, VA (US); Allen D. Parks, Spotsylvania, VA (US)

(72) Inventors: Scott E. Spence, Fredericksburg, VA (US); Allen D. Parks, Spotsylvania, VA (US)

(73) Assignee: United States of America, as represented by the Secretary of the Navy, Arlington, VA (US)

( * ) Notice: Subject to any disclaimer, the term of this patent is extended or adjusted under 35 U.S.C. 154(b) by 248 days.

(21) Appl. No.: 17/008,812

(22) Filed: Sep. 1, 2020

(65) Prior Publication Data
US 2022/0066279 A1    Mar. 3, 2022

(51) Int. Cl.
*G02F 1/225* (2006.01)
*G01B 9/02* (2022.01)
*G02F 1/21* (2006.01)

(52) U.S. Cl.
CPC ............... *G02F 1/225* (2013.01); *G01B 9/02* (2013.01); *G02F 1/212* (2021.01)

(58) Field of Classification Search
CPC ......... G02F 1/212; G02F 1/225; B82Y 10/00; G02B 2006/12159
See application file for complete search history.

(56) References Cited

U.S. PATENT DOCUMENTS

| 8,411,278 | B2 | 4/2013 | Parks et al. ............... 356/450 |
| 8,619,261 | B2 | 12/2013 | Parks et al. ............... 356/450 |
| 8,970,844 | B2 | 3/2015 | Parks et al. ............... 356/450 |
| 2021/0088870 | A1* | 3/2021 | Melikyan ............... G02F 1/225 |

OTHER PUBLICATIONS

Pereira, Alexandro et al. "On the use of a virtual Mach-Zehnder interferometer in the teaching of quantum mechanics". 2009 Phys. Educ. 44 281, May 2009, pp. 281-291. (Year: 2009).*

(Continued)

*Primary Examiner* — Michael A Lyons
(74) *Attorney, Agent, or Firm* — Gerhard W. Thielman

(57) ABSTRACT

A Mach-Zehnder interferometer (MZI) is provided to receive a coherent input photon in an initial pointer state for producing a continuously variable "faux qubit" in a magic state. The MZI apparatus includes first and second ports, first and second beam-splitters, first and second mirrors, and a modular interaction operator. The emitter produces an input coherent photon in an initial pointer state along an emission direction. The first and second ports are respectively disposed parallel and perpendicular to the emission direction. The first and second beam-splitters are disposed respectively collinearly with the emission direction and between the first and second ports parallel to and offset from the emission direction. The first and second mirrors are disposed respectively offset from and collinearly with the emission direction. The modular interaction operator is disposed between the first mirror and the second beam-splitter for measuring interaction therebetween to generate a post-selected magic state photon.

4 Claims, 1 Drawing Sheet

(56) References Cited

OTHER PUBLICATIONS

Parks, A. D. et al. "An observed manifestation of a parity symmetry in the backward in time evolved post-selected state of a twin Mach-Zehnder interferometer". Quantum Stud.: Math. Found. (2017) 4:315-322. (Year: 2017).*

A. D. Parks et al.: "Capacity and Entropy of a Retro-Causal Channel . . . " *Entropy* 20(411) 2018. https://www.mdpi.com/1099-4300/20/6/411/pdf-vor.

A. D. Parks et al.: "A note concerning the modular valued von Neumann interaction operator" *Quant. Stud.* 6(1) 2018. https://www.researchgate.net/publication/323334954_A_note_concerning_the_modular_valued_von_Neumann_interaction_operator.

A. M. Souza et al.: "Experimental magic state distillation for fault-tolerant quantum computing" *Nature Comm.* 2(169) 2011. https://www.nature.com/articles/ncomms1166.pdf.

A. D. Parks et al.: "Weak value amplification of an off-resonance Goos-Hänchen shift . . . " *App. Optics* 54(18) 2015.

K. J. Reich et al.: "Experimental realization of the quantum box problem" *Phys. Lett. A* 324(125) 2004. http://www.photonicquantum.info/Research/publications/Resch%20Quantum%20box%20PLA%202004.pdf.

A. D. Parks et al.: "A Pointer Theory Explanation of Weak Value Persistence Occurring in the Quantum Three Box Experimental Data",*ACTA Physica Polonica A* 130, 2016. http://przyrbwn.icm.edu.pl/APP/PDF/130/a130z6p02.pdf.

* cited by examiner

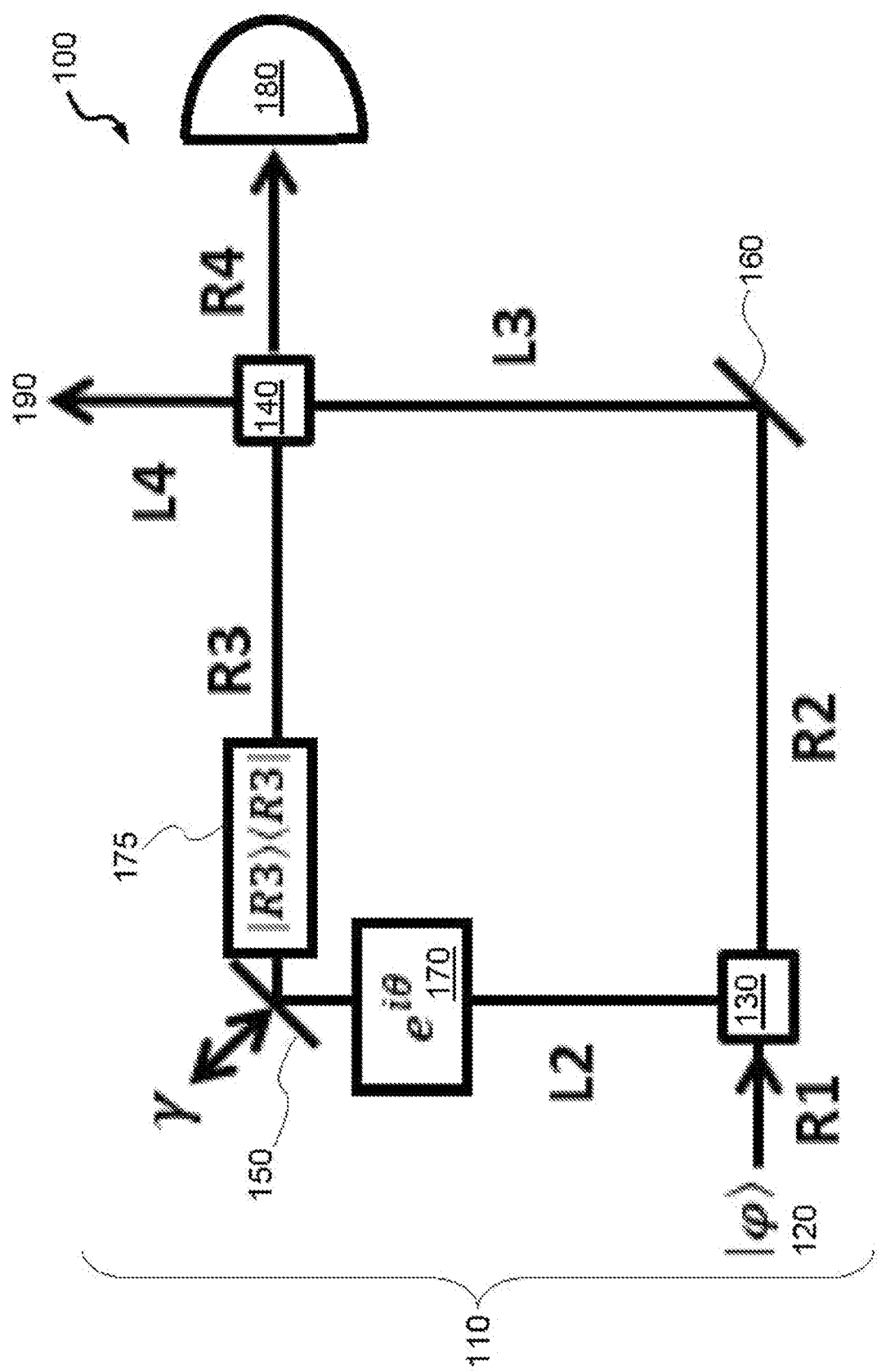

MACH ZEHNDER INTERFEROMETER FOR MAGIC STATE DISTILLATION

STATEMENT OF GOVERNMENT INTEREST

The invention described was made in the performance of official duties by one or more employees of the Department of the Navy, and thus, the invention herein may be manufactured, used or licensed by or for the Government of the United States of America for governmental purposes without the payment of any royalties thereon or therefor.

BACKGROUND

The invention relates generally to magic state distillation. In particular, a single Mach-Zehnder Interferometer (MZI) configuration for producing large numbers of high quality optical continuous states using weak measurements.

Digital computation involves strings of binary bits to form instructions and memory by each bit being assigned temporally as one of two states, "on" or "off" for example. In quantum computation, these are replaced by quantum bits or "qubits" that exhibit a mixed state within a continuum between the two states. Quantum computing has the potential to perform operations beyond practical abilities of a classical computer by employing mixed states in superposition, Optical computing replaces electrons with photons for logic processing.

One challenge of quantum computing involves fault tolerance from interaction of qubits. Techniques for quantum error correction were addressed by J. Preskill in "Reliable quantum computers" *Proc. R. Sac. London* A 454, 385-410 (available at http://www.theory.caltech.edu/~preskill/pubs/preskill-1998-reliable.pdf). In addition, non-Gaussian noise can also induce decoherence of qubits, rendering them inoperative. This condition can be mitigated by creation of superconducting loops called "faux qubits" to sense this disruptive magnetic flux noise. See V. Sung et al. "Non-Gaussian noise spectroscopy . . . " *Nat. Comm.* 10.3715 (available at https://www.nature.com/articles/s41467-019-11699-4.pdf). Such faux qubits facilitate validation and tailoring of error-correcting codes for ensuring accurate quantum computation.

Fault-tolerant protocols impose implementation costs for a given logical operation, such as a unitary gate or a measurement with a desired accuracy. Such costs may depend on selection of fault-tolerant protocols, which in turn may depend on whether or not the operation belongs to a Clifford group. Logical Clifford operations have relatively low cost, but non-Clifford gates constitute a large portion of circuits of interest in quantum computing. One technique for constructing low overhead protocols involves magic state distillation, which involves an ancillary resource state $\psi$ that combines universality and distillability. This ancilla $\psi$ can be destroyed in the process.

Magical state distillation denotes an easy and inexpensive technique for producing faux qubits in optical computing. This technique to create magic states involving purifying n copies of a mixed state by applying a decoding operation to these copies to produce a pure state with each copy having the same uniform value. However, this purification can be difficult when applied to several low fidelity mixed state copies to produce a few high fidelity pure state copies.

SUMMARY

Conventional magic state distillation yields disadvantages addressed by various exemplary embodiments of the present invention. In particular, various exemplary embodiments provide magic state distillation for quantum computing. The distillation technique produces an intense optical signal as output of an MZI apparatus to produce a continuously variable "faux qubit" in a magic state from a received an input coherent photon in an initial pointer state along an emission direction.

The MZI apparatus includes first and second ports, first and second beam-splitters, first and second mirrors, and a modular interaction operator. The first and second ports are respectively disposed parallel and perpendicular to the emission direction. The first port has a detector. The first beam-splitter is disposed collinearly with the emission direction. The second beam-splitter is disposed between the first and second ports in parallel to and offset from the emission direction. The input photon reflects from the mirrors. Each beam-splitter either passes through or else reflects the input photon.

The first mirror is disposed from the first and second beam-splitters respectively perpendicular and parallel to the emission direction. The second mirror is disposed from the first and second beam-splitters respectively collinearly with and perpendicular to the emission direction. The modular interaction operator disposed between the first mirror and the second beam-splitter for measuring interaction therebetween, from which the interaction generates a post-selected magic state photon. Further embodiments include an actuator that translates the first mirror diagonally to and from the beam-splitters to set coupling strength. Additional embodiments enable a phase angle shift between the first beam-splitter and the first mirror.

BRIEF DESCRIPTION OF THE DRAWINGS

These and various other features and aspects of various exemplary embodiments will be readily understood with reference to the following detailed description taken in conjunction with the accompanying drawings, in which like or similar numbers are used throughout, and in which:

FIGURE is a schematic diagram view of a single MZI.

DETAILED DESCRIPTION

In the following detailed description of exemplary embodiments of the invention, reference is made to the accompanying drawings that form a part hereof, and in which is shown by way of illustration specific exemplary embodiments in which the invention may be practiced. These embodiments are described in sufficient detail to enable those skilled in the art to practice the invention. Other embodiments may be utilized, and logical, mechanical, and other changes may be made without departing from the spirit or scope of the present invention. The following detailed description is, therefore, not to be taken in a limiting sense, and the scope of the present invention is defined only by the appended claims.

Obtaining high fidelity "magic states" can be considered difficult. Conventional approaches to high fidelity "magic state" production involve distillation methods to obtain a small number of high fidelity "magic states" from a large number of low fidelity "magic states" being more abundant.

The optical quantum computing industry needs to readily and cheaply produce large numbers of high quality optical continuously variable magic states. In general, producing such magic states requires a fairly costly and extensive distillation process to produce small numbers of high-fidelity magic states. Exemplary embodiments provide a simple inexpensive technique for creating large numbers of high fidelity optical continuously variable magic states without the need for the application of distillation procedures.

An exemplary theory for a modular valued von Neumann interaction operator $\hat{V}_m$, shows that the action of modular interaction operator $\hat{V}_m$ upon coherent laser light created a continuously variable "faux qubit" likened a magic state. See A. D. Parks et al. "Capacity and Entropy of a Retro-Causal Channel . . . " *Entropy* 20 (411) (available at https://www.mdpi.com/1099-4300/20/6/411/pdf-vor) and A. D. Parks et al. "A note concerning the modular valued von Neumann interaction operator" *Quant. Stud.* 6 (1) 101-105 (available at https://www.researchgate.net/publication/32333495_A_note_concerning_the_modular_valued_von_Neumann_interaction_operator). Under certain conditions (Gaussian input, $$\frac{\pi}{4}$$

phase, proper post-selection state) these "faux qubits" are equivalent to optical continuously variable "magic states" within the quantum physics community.

Exemplary embodiments provide implementations of modular interaction operators $\hat{V}_m$ using simple optical devices that create as output large numbers of high fidelity optical continuously variable "magic states" when coherent Gaussian laser light passes therethrough. The von Neumann interaction operator $\hat{V}$ describes the coupling between a quantum system and a measurement pointer according to the relation:

$$\hat{V} = e^{-\frac{2\pi}{h}\gamma\hat{A}\hat{p}} \equiv \exp\left(-\frac{2\pi}{h}\gamma\hat{A}\hat{p}\right), \tag{1}$$

where $\hat{A}$ is the system observable to be measured, $\hat{p}$ is the pointer's momentum operator and the transient integral:

$$\gamma = \int \gamma(t)dt, \tag{2}$$

is the coupling strength of the operator $\hat{A}$ to the measurement apparatus' pointer. The Planck constant h divided by $2\pi$ can also written as the Dirac constant $\hbar$.

When operator $\hat{A}$ is a projector, the general modular valued von Neumann operator is defined exactly by:

$$\hat{V}_m = \frac{\langle \psi_f | \hat{V} | \psi_i \rangle}{\langle \psi_f | \psi_i \rangle} = (1 - A_w)\hat{I} + A_w\hat{S}, \tag{3}$$

where $\hat{I}$ is the identity operator, $\hat{S}$ is the pointer position translation operator, and $A_w$ is the weak value of operator $\hat{A}$ given by:

$$A_w = \frac{\langle \psi_f | \hat{A} | \psi_i \rangle}{\langle \psi_f | \psi_i \rangle}, \tag{4}$$

where $|\psi_i\rangle$ and $|\psi_f\rangle$ are the respective pre-selected and post-selected states of the quantum system at measurement time.

For momentum operator $\hat{p}$ and the initial real valued pointer state $|\varphi\rangle$ being continuous, then the action of the modular interaction operator $\hat{V}_m$ upon initial pointer state $|\varphi\rangle$ yields the exact normalized post-measurement pointer state $|\Phi\rangle$ expressed as:

$$|\Phi\rangle \equiv \hat{V}_m|\varphi\rangle = \frac{e^{ix}}{M}[(1 - A_w|\varphi\rangle + A_w\hat{S}|\varphi\rangle], \tag{5}$$

or alternatively as:

$$|\Phi\rangle = \frac{e^{ix}}{M}[(1 - A_w|\tilde{0}\rangle + A_w|\tilde{1}\rangle], \tag{6}$$

where the exponential, initial pointer state and pointer position translation operator are expressed as:

$$e^{ix} = \frac{\langle \psi_f | \psi_i \rangle}{|\langle \psi_f | \psi_i \rangle|}, \tag{7}$$

$$|\varphi\rangle \equiv |\tilde{0}\rangle, \tag{8}$$

$$\hat{S}|\varphi\rangle \equiv |\tilde{1}\rangle, \tag{9}$$

and denominator is based on the weak measurement $$M = \left[1 - 2\operatorname{Re} A_w + 2|A_w|^2 + A_w(1 - A_w^*)\langle \tilde{0}|\tilde{1}\rangle + A_w^*(1 - A_w)\langle \tilde{1}|\tilde{0}\rangle\right]^{\frac{1}{2}}. \tag{10}$$

The post-measurement state $|\Phi\rangle$ given by eqn. (6) is the general continuously variable "faux qubit" based on weak measurement $A_w$ and its complex conjugate (denoted by asterisk *). The adjective "general" is used again here to emphasize the fact that—as mentioned above—specific modular interaction operators $\hat{V}_m$'s are determined by the weak value $A_w$. The term "faux qubit" (i.e., fake qubit) is used here because, although states $\langle \tilde{0}|\tilde{0}\rangle = 1 = \langle \tilde{1}|\tilde{1}\rangle$, and approximate states $|\tilde{0}\rangle$ and $|\tilde{1}\rangle$ are orthogonal only in the limit of infinitely large coupling strengths $\gamma$.

The exact spatial distribution profile of a general "faux qubit" is:

$$|\langle q|\Phi\rangle|^2 = \left(\frac{1}{M^2}\right)\{|1 - A_w|^2 |\langle q|\tilde{0}\rangle|^2 \tag{11}$$
$$+ |A_w|^2 |\langle q|\tilde{1}\rangle|^2 + 2\operatorname{Re}[A_w(1 - A_w^*)\langle q|\tilde{0}\rangle\langle q|\tilde{1}\rangle]\},$$

or $$\Phi^2(q) = \left(\frac{1}{M^2}\right) \tag{12}$$
$$\{|(1 - A_w)|^2 \varphi^2(q) + |A_w|^2 \varphi^2(q - \gamma) + 2\operatorname{Re}[A_w(1 - A_w^*)\varphi(q)\varphi(q - \gamma)]\}.$$

Here $\hat{q}$ is the pointer position operator conjugate to momentum operator $\hat{p}$.

Hence, use has been made of operator states expressed as:

$$\langle q|\Phi\rangle = \Phi(q) \tag{13}$$

$$\langle q|\tilde{0}\rangle = \langle q|\varphi\rangle = \varphi(q), \tag{14}$$

and $$\langle q|\hat{I}\rangle = \langle q|\hat{S}|\varphi\rangle = \varphi(q-\gamma). \tag{15}$$

Observe that for sufficiently large coupling strength $\gamma$, the operator state $\varphi(q)\varphi(q-\gamma)$ becomes small so that the post-measurement pointer state approximates to:

$$\Phi^2(q) \approx \left(\frac{1}{M^2}\right)\{|(1-A_w)|^2 \varphi^2(q) + |A_w|^2 \varphi^2(q-\gamma)\}. \tag{16}$$

The drawings show a schematic diagram view 100 of a Mach Zehnder interferometer (MZI) 110 that generates continuously variable optical magic states called "faux qubits" via modular interaction operator $\hat{V}_m$. Such a configuration includes the single MZI 110. Input light 120 in the Gaussian pointer state $|\varphi\rangle$ as a photon from an emission source travels through light input port R1 along the emission direction to enter a first beam-splitter 130 that divides the input light 120 into paths left L2 and right R2. A second beam-splitter 140 is described subsequently, along with first and second mirrors 150 and 160. Note that the right path R2 and left path L2 are respectively collinear with and perpendicular to the emission direction from input port R1.

The exemplary MZI 110 contains an arbitrary $\theta$ phase shift 170 on left path L2. The phase shift 170 can be induced by a polarizer or other related device. The first mirror 150 reflects the left path L2 to a right path R3, and can be translated diagonally in the plane of view 100 shown to produce an arbitrary coupling strength $\gamma$. Such motion can be accomplished by an actuator that translates the mirror 150. This induces a projection operator 175 corresponding to interaction $\hat{A} \equiv R3\rangle\langle R3|$ to be measured on the right path R3. The second mirror 160 reflects the right path R2 to a left path L3. Note that the right path R3 and left path L3 are respectively parallel and perpendicular to the emission direction from input port R1.

Both paths right R3 and left L3 enter the second beam-splitter 140 to travel either along right output path to its receiver port R4 with detector 180 or else along left output path to its receiver port L4 for path termination 190. Both right, paths R3 and R4 are parallel to the emission direction. Both left paths L3 and L4 are perpendicular to the emission direction. The emission source emits classically intense coherent laser light 120 in the Gaussian state $|\varphi\rangle$. The input port R1 corresponds to the pre-selected path state $|R1\rangle$. Light that exits the output port R4 to the detector 180, which corresponds to the post-selected path state $\langle R4|$, denotes the "faux qubit" state given by eqn. (6).

One can determine the weak value of operator 175 for interaction $\hat{A} \equiv |R3\rangle\langle R3|$. This necessitates propagating the pre-selected path state $|R1\rangle$ forward and the post-selected path state $|R4\rangle$ backward through the MZI 110 to measure operator 175 along path R3. Application of the associated well-known transformations to path states $|R1\rangle$ and $|R4\rangle$ yields the respective pre- and post-selected states:

$$|\psi_i\rangle = \frac{1}{\sqrt{2}}[-e^{i\theta}|R3\rangle + i|L3\rangle], \tag{17}$$

and $$|\psi_f\rangle = \frac{1}{\sqrt{2}}[|R3\rangle - i|L3\rangle]. \tag{18}$$

The weak value of operator $\hat{A}$ 175 is obtained by substituting these states into eqn. (4):

$$A_w = \frac{\frac{1}{\sqrt{2}}[\langle R3| + i\langle L3|]|R3\rangle\langle R3|[-e^{i\theta}|R3\rangle + i|L3\rangle]\frac{1}{\sqrt{2}}}{\frac{1}{\sqrt{2}}[\langle R3| + i\langle L3|][-e^{i\theta}|R3\rangle + i|L3\rangle]\frac{1}{\sqrt{2}}} = \tag{19}$$

$$\frac{e^{i\theta}}{e^{i\theta}+1} = \frac{1}{2}\left(1 + i\tan\frac{\theta}{2}\right).$$

Using these states and this weak value in eqns. (7) and (10), one finds that:

$$e^{ix} = \frac{\frac{1}{\sqrt{2}}[\langle R3| + i\langle L3|][-e^{i\theta}|R3\rangle + i|L3\rangle]\frac{1}{\sqrt{2}}}{\frac{1}{\sqrt{2}}|[\langle R3| + i\langle L3|][-e^{i\theta}|R3\rangle + i|L3\rangle]|\frac{1}{\sqrt{2}}} = \frac{-(e^{i\theta}+1)}{|e^{i\theta}+1|}, \tag{20}$$

and post-measurement denominator from eqn. 0) is:

$$M = \{2[|A_w|^2 + \text{Re}(A_w^2\langle\varphi|\hat{S}|\varphi\rangle)]\}^{\frac{1}{2}}. \tag{21}$$

After substituting these expressions into eqn. (6) and using the weak measurement fact that:

$$1 - A_w = \frac{1}{e^{i\theta}+1}, \tag{22}$$

one finds that the associated "faux quoit" assumes the exact form:

$$|\phi\rangle = N[|\tilde{0}\rangle + e^{i0}|\tilde{1}\rangle], \tag{23}$$

where N is the normalization factor. The overlap integral can be expressed as:

$$\langle|\hat{S}\varphi\rangle = \int_{-\infty}^{\infty}\varphi(q)\varphi(q-\gamma)dq, \tag{24}$$

and thus is real valued. Recall the trigonometric equality:

$$e^{i\theta} = \cos\theta + i\sin\theta. \tag{25}$$

Then the normalization factor is:

$$N = \frac{1}{M|e^{i\theta}+1|} = \tag{26}$$

$$-\left\{(1+\cos\theta)\left[(1+\langle\varphi|\hat{S}|\varphi\rangle) + (1-\langle\varphi|\hat{S}|\varphi\rangle)\tan^2\frac{\theta}{2}\right]\right\}^{-\frac{1}{2}}.$$

The associated exact spatial intensity profile observed at output port R4 is:

$$|\langle q|\Phi\rangle|^2 = N^2\{\langle q|\tilde{0}\rangle^2 + \langle q|\tilde{1}\rangle^2 + 2\langle q|\tilde{0}\rangle\langle q|\tilde{1}\rangle \cos\theta\}. \quad (27)$$

Here, use has been made of the fact that both $\langle q|\tilde{0}\rangle$ and $\langle q|\tilde{1}\rangle$ are real valued.

When phase angle $$\theta = \frac{\pi}{4}$$

for shift 170, men eqn. (23) for the "faux qubit" becomes the continuously variable magic state:

$$|\Phi\rangle = N\left[|\tilde{0}\rangle + e^{i\frac{\pi}{4}}|\tilde{1}\rangle\right]. \quad (28)$$

This implies that the normalization factor N must be evaluated at $$\frac{\pi}{4}.$$

Using eqns. (17) and (18), one readily discovers the probability that a magic state $|\Phi\rangle$ exits output port R4 towards detector 180 becomes:

$$|\langle \psi_f | \psi_i \rangle|^2 = \frac{2+\sqrt{2}}{4} \cong 0.8535, \quad (29)$$

thereby indicating a high probability of magic state qubits produced.

Exemplary embodiments produce large numbers of high fidelity optical "magic states" inexpensively and simply without requiring the application of distillation procedures. Production is such that 85.35% of all photons exiting $\hat{V}_m$ are in the "magic state" by this technique. Mach-Zehnder interferometers with the proper internal phase angle of $$\theta = \frac{\pi}{4},$$

which are the embodiment of modular interaction operators $\hat{V}_m$, are straightforward to fabricate and miniaturize.

The modular interaction operator $\hat{V}_m$ with phase angle $$\theta = \frac{\pi}{4}$$

and any desired coupling strength $\gamma$ can be miniaturized. Similar miniaturized modular interaction operators $\hat{V}_m$'s can be made that produce quantum particles (other than photons) in "magic states" as faux qubits.

While certain features of the embodiments of the invention have been illustrated as described herein, many modifications, substitutions, changes and equivalents will now occur to those skilled in the art. It is, therefore, to be understood that the appended claims are intended to cover all such modifications and changes as fall within the true spirit of the embodiments.

What is claimed is:

1. A Mach-Zehnder interferometer (MZI) that receives a coherent input photon in an initial pointer state along an emission direction for producing a continuous variable qubit, said MZI comprising:

first and second output ports perpendicular to each other and respectively disposed parallel and perpendicular to the emission direction, said first output port having a detector;

first and second beam-splitters, said first beam-splitter disposed collinearly with the emission direction, said second beam-splitter disposed adjacent said first and second output ports and being parallel to and offset from the emission direction;

first and second mirrors, said first mirror disposed offset from said first beam-splitter and perpendicular to the emission direction, said second mirror disposed collinearly with the emission direction and said first beam-splitter; and a weak value interaction operator disposed between said first mirror and said second beam-splitter for measuring interaction therebetween, wherein the input photon either reflects from or else passes through said first beam-splitter, reflects from either of said first and second mirrors, either reflects from or else passes through said second beam-splitter, and said interaction operator generates a post-selected magic state photon at said detector to produce the continuous variable qubit.

2. The MZI according to claim 1, further including an actuator for translating said first mirror diagonally to and from said beam-splitters to set coupling strength.

3. The MZI according to claim 1, further including a means for phase angle shift between said first beam-splitter and said first mirror.

4. The MZI according to claim 3, wherein said phase angle is $$\frac{\pi}{4}.$$

* * * * *